United States Patent
Li et al.

(10) Patent No.: US 10,652,295 B2
(45) Date of Patent: May 12, 2020

(54) METHOD FOR OPTIMIZING THE THROUGHPUT OF MULTIMEDIA CONTENTS ACCESSIBLE BY AT LEAST ONE USER TERMINAL, CORRESPONDING COMPUTER PROGRAM PRODUCT AND MANAGEMENT DEVICE

(71) Applicants: ORANGE, Paris (FR); Universite de Rennes 1, Rennes (FR)

(72) Inventors: Yue Li, Cesson Sevigne (FR); Philippe Bertin, Acigne (FR); Yassine Hadjadjaoul, Vitre (FR)

(73) Assignees: ORANGE, Paris (FR); UNIVERSITE DE RENNES 1, Rennes (FR)

( * ) Notice: Subject to any disclaimer, the term of this patent is extended or adjusted under 35 U.S.C. 154(b) by 37 days.

(21) Appl. No.: 16/090,412

(22) PCT Filed: Mar. 31, 2017

(86) PCT No.: PCT/EP2017/057677
§ 371 (c)(1),
(2) Date: Oct. 1, 2018

(87) PCT Pub. No.: WO2017/167958
PCT Pub. Date: Oct. 5, 2017

(65) Prior Publication Data
US 2019/0116213 A1    Apr. 18, 2019

(30) Foreign Application Priority Data

Apr. 1, 2016   (FR) .................................... 16 52901

(51) Int. Cl.
*H04L 29/06*      (2006.01)
*H04L 12/24*      (2006.01)
(Continued)

(52) U.S. Cl.
CPC ...... *H04L 65/4092* (2013.01); *H04L 29/0651* (2013.01); *H04L 29/06476* (2013.01);
(Continued)

(58) Field of Classification Search
CPC ......... H04L 12/40065; H04L 29/06176; H04L 29/06448–0651; H04L 29/06523;
(Continued)

(56) References Cited

U.S. PATENT DOCUMENTS 10,148,716 B1 * 12/2018 Joseph .................... G06F 16/16
2011/0082924 A1   4/2011 Gopalakrishnan
(Continued)

FOREIGN PATENT DOCUMENTS

WO    2013017165 A1   2/2013

OTHER PUBLICATIONS

English Translation of the Written Opinion of the International Searching Authority dated Jun. 13, 2017, for corresponding International Application No. PCT/EP2017/057677, filed Mar. 31, 2017.
(Continued)

*Primary Examiner* — Brendan Y Higa
(74) *Attorney, Agent, or Firm* — David D. Brush; Westman, Champlin & Koehler, P.A.

(57) ABSTRACT

A method is proposed for optimizing the bit rate of multimedia contents accessible by a plurality of user terminals connected to a radiocommunications network cell. The multimedia contents are stored in the form of a plurality of independent chunks on at least one multimedia contents server associated with at least one contents provider. The method includes the following steps, implemented in a device for optimizing the bit rate: receiving one request to obtain a multimedia description file, sent by a user terminal; obtaining a multimedia description file; modifying the multimedia description file on the basis of a piece of information
(Continued)

representing a quality of delivery, delivering a modified multimedia description file; and transmitting the modified multimedia description file to the user terminal.

12 Claims, 3 Drawing Sheets

(51) Int. Cl.
| | |
|---|---|
| *H04N 21/2343* | (2011.01) |
| *H04L 12/801* | (2013.01) |
| *H04N 21/647* | (2011.01) |
| *H04N 21/6373* | (2011.01) |
| *H04L 12/70* | (2013.01) |

(52) U.S. Cl.
CPC ............ *H04L 41/142* (2013.01); *H04L 47/10* (2013.01); *H04L 47/11* (2013.01); *H04L 65/105* (2013.01); *H04L 65/4084* (2013.01); *H04L 65/605* (2013.01); *H04L 65/607* (2013.01); *H04L 65/608* (2013.01); *H04L 65/80* (2013.01); *H04N 21/2343* (2013.01); *H04N 21/6373* (2013.01); *H04N 21/64738* (2013.01); *H04L 2012/5632* (2013.01)

(58) Field of Classification Search
CPC ............... H04L 41/0896; H04L 41/142; H04L 47/00–11; H04L 47/12; H04L 47/127; H04L 65/00; H04L 65/4069–608; H04L 65/80; H04L 2012/5631–5632; H04L 2012/568; H04L 2012/6456; H04W 28/02; H04W 28/0247; H04W 28/0273; H04W 28/0284; H04W 28/0289; H04W 72/12; H04W 72/1226–1257; H04N 21/2343; H04N 21/6373; H04N 21/6377; H04N 21/6379; H04N 21/64738
See application file for complete search history.

(56) References Cited

U.S. PATENT DOCUMENTS

| | | | |
|---|---|---|---|
| 2011/0119394 A1* | 5/2011 | Wang | H04L 65/60 |
| | | | 709/231 |
| 2012/0124179 A1 | 5/2012 | Cappio et al. | |
| 2016/0337680 A1* | 11/2016 | Kalagi | H04N 21/2662 |
| 2016/0366202 A1* | 12/2016 | Phillips | H04N 21/26258 |
| 2017/0353516 A1* | 12/2017 | Gordon | H04N 21/8456 |

OTHER PUBLICATIONS

French Search Report and Written Opinion dated Dec. 14, 2016, for corresponding French Application No. 1652901, filed Apr. 1, 2016.
"3rd Generation Partnership Project; Technical Specification Group Services and System Aspects; Transparent end-to-end Packet-switched Streaming Service (PSS); Progressive Download and Dynamic Adaptive Streaming over HTTP (3GP-DASH) (Release 13)." 3GPP TS 26.247 V13.2.0. Dec. 2015.
Jose Oscar Fajardo et al. "Improving Content Delivery Efficiency through Multi-Layer Mobile Edge Adaptation." IEEE Network, vol. 29, No. 6, pp. 40-46. Nov.-Dec. 2015.
International Search Report and Written Opinion dated Jun. 7, 2018 for corresponding International Application No. PCT/EP2017/057677, filed Mar. 31, 2017.

* cited by examiner

METHOD FOR OPTIMIZING THE THROUGHPUT OF MULTIMEDIA CONTENTS ACCESSIBLE BY AT LEAST ONE USER TERMINAL, CORRESPONDING COMPUTER PROGRAM PRODUCT AND MANAGEMENT DEVICE

CROSS-REFERENCE TO RELATED APPLICATIONS

This Application is a Section 371 National Stage Application of International Application No. PCT/EP2017/057677, filed Mar. 31, 2017, the content of which is incorporated herein by reference in its entirety, and published as WO 2017/167958 on Oct. 5, 2017, not in English.

1 TECHNICAL FIELD

The field of the invention is that of radiocommunications networks capable of delivering a multimedia content to user terminals.

More specifically, the invention relates to a method for optimizing the bit rate of the multimedia contents accessible by terminals connected to a cell of the radiocommunications network in question.

The invention has many applications, especially but not exclusively in the field of mobile radiocommunications networks, for example cell networks compliant with the 3GPP ($3^{rd}$ Generation Partnership Project) standards.

2 TECHNOLOGICAL BACKGROUND

The technique of broadcasting using DASH (dynamic adaptive streaming over HTTP (hypertext transfer protocol)) technology is one of the existing technologies that enable that broadcasting of multimedia contents on a communications network.

By way of an illustration of these technologies, FIGS. 1a and 1b present a known configuration where a DASH client is embedded in a user terminal 100, for example a mobile terminal connected to an access node 140 of a mobile network, for example a base station of a 2G, 3G, 4G or other type of cell network.

At a step E101, the user terminal 100 identifies itself with an identification server 110 of a multimedia content provider. If the terminal 100 is not known, it can also be a step of registration with this content provider.

At a step E102, the identification server 110 gives the user terminal 100 confirmation of its successful identification or, as the case may be, confirmation of its registration.

To this end, the exchanges between entities can transit through different servers included in the network core 150, for example an SGW (Serving Gateway) or PGW (Packet Data Network Gateway).

At a step E103, the user terminal 100 sends a DASH request to a managing server 120 of the multimedia contents provider. More specifically, this request relates to a multimedia description file or manifest file called an MPD (media presentation description), corresponding to a particular multimedia content that the user of the user terminal 100 is seeking (whether it is to download it and subsequently use it or else to immediately use in streaming mode).

Indeed, the DASH technology stipulates that a given multimedia content, for example a video or sound content, is available in the form of segments, called chunks, each corresponding to a certain duration of the multimedia content in question. Different chunks can correspond to a same fraction of the multimedia content, i.e. to a same passage of the video or sound content in question, but each with a different quality, each corresponding to a different encoding bit rate, for example because of a different resolution or a different encoding system.

At a step E104, the MPD manifest file corresponding to the multimedia content sought is returned to the user terminal 100.

The DASH client installed in the user terminal 100 then interprets the MPD file received and selects chunks of the desired multimedia content that present a quality and hence ultimately a bit rate that matches its need (for example the size and resolution of the screen of the terminal if it is a video content).

At a step E105, the user terminal 100 sends another request for obtaining the pre-selected chunks to a multimedia contents server 130 belonging to a content delivery network (CDN) of the multimedia content provider. This provider then returns the requested chunk or chunks at a step E106, this chunk or chunks corresponding to the quality and therefore to the bit rate selected by the DASH client installed in the user terminal 100.

Thus, in the existing approach, the DASH clients interpret MPD files representing the content of provider files of servers of multimedia contents providers and dynamically select the quality and therefore the bit rate most favorable to their own needs, i.e. without taking account of the needs of other users. This behavior which raises no particular problem in wired applications where each user has a distinct transmission channel, becomes a source of problems in a cell radiocommunications system in which several users connected to a same network cell share only one radio resource, this radio resource being finite. This behavior can effectively lead to an unfair distribution of the bandwidth available for the different users connected to a same network cell, especially when there is congestion in this network cell.

In addition, DASH clients often make an inaccurate assessment of network bandwidth. The decision made by DASH clients in selecting the quality and associated bit rate is therefore often sub-optimal, leading to a deterioration of the overall quality experienced by the users on the whole.

This set of problems and issues is aggravated in modern cell technology such as 4G technology, for which the user applications are increasingly multimedia-oriented and for which the quantity of data transferred is increasingly large.

Besides, there are major fluctuations in network bandwidth in a radiocommunications network cell related to changing conditions of propagation. This also contributes to the difficult of estimating the network bandwidth for such applications.

However, the cell network MEC (Mobile Edge Computing) technology which is being standardized with the ETSI (European Telecommunications Standards Institute) offers the advantage of making use of a location on the edge of a cell network to optimize applications dedicated to the users of such a cell network. To this end, MEC technology proposes to introduce dedicated MEC servers. Such MEC servers are implanted in contact with base stations managing the radio part of the cell networks, for example the eNodeB in 4G technology, so as to host dedicated applications and give them both the flexibility of being able to manage traffic to and from mobile users and the possibility of accessing information in real time on the working of the radio part of the network. These applications can be managed either directly by the operator of the network or by third parties, for example contents providers.

It can thus be seen that MEC technology could be adapted to problems of managing bit rates of broadcasting multimedia contents in a cell network and in a multi-user environment.

Certain research work has recently been made on the subject. In particular, the method described in the article by J. Fajardo, I. Taboada, and F. Liberal, «*Improving content delivery efficiency through multi-layer mobile edge adaptation,*» Network, IEEE, vol. 29, no. 6, pp. 40-46, November 2015, proposes an assisted mobile network approach based on a continuously adaptive HTTP protocol with a multilayer encoding and MEC tools. In particular, a Mobile Edge-DASH adapting function situated within the cloud radio access network or centralized radio access network (C-RAN) is being introduced to combine the network context, the user context and the state of the cell. However, this approach does not resolve the issues and problems described here above related to the behavior of DASH clients which select the quality of the proposed chunks in the MPD files solely on the basis of their own needs and capacities.

More generally, there is as yet no mechanism to maximize the quality of the overall experience of DASH clients situated in a same radiocommunications network cell.

There is thus a need to improve the user experience during simultaneous access to multimedia contents available on remote servers by terminals sharing a same limited radiofrequency network of a cell radiofrequency network type, especially in avoiding network congestion.

There is also a need that the sharing of radiofrequency resources among the different users should adapt in real time to the operational conditions of the network cell.

3 SUMMARY

One embodiment of the invention proposes a method for optimizing the bit rate of multimedia contents accessible by a plurality of user terminals connected radiocommunications network cell, said multimedia contents being stored in the form of a plurality of independent chunks on at least one multimedia contents server associated with at least one contents provider. Such a method for optimizing the bit rate comprises the following steps, implemented in a device for optimizing the bit rate:
   receiving at least one request to obtain at least one file representing at least one available quality corresponding to a bit rate for at least one chunk of at least one of said multimedia contents, called a multimedia description file, said request being sent by at least one user terminal of said plurality of user terminals to access said at least one multimedia contents;
   obtaining said at least one multimedia description file;
   modifying said at least one multimedia description file on the basis of at least one piece of information representing a quality of delivery of said at least one multimedia content to the at least one user terminal, called information on quality of delivery, said modification delivering at least one modified multimedia description file; and
   transmitting said at least one modified multimedia description file to said at least one user terminal in response to said at least one request.

Thus, the invention proposes a novel and inventive solution to improve user experience by optimizing the bit rate of multimedia contents accessible by the user terminals connected to a radiocommunications network cell and thereby avoiding, reducing or reabsorbing congestion in the network cell.

To this end, the invention proposes a method in which all the requests for the multimedia description files or manifest files, corresponding to multimedia contents sought, sent by the user terminals of the network cell, as well as all the manifest files provided in return by the servers of the contents provider travel through a device for optimizing the bit rate. The optimizing device which thus centralizes the data is then capable of modifying the contents of these manifest files so as to prohibit the obtaining, by the corresponding user terminals, of chunks of multimedia contents associated with a quality having a bit rate deemed to be far too great as compared with a piece of information representing quality of delivery.

As a result, the optimizing device makes it possible to prevent, reduce or ease congestion by optimizing the bit rate in the cell.

According to one embodiment, the step for obtaining comprises the following sub-steps:
   transmitting said at least one request to at least one management server of said at least one contents provider;
   receiving said at least one multimedia description file, said multimedia description file being transmitted by said at least one management server of said at least one contents provider.

Thus, the optimizing device does not directly manage the multimedia description files but transfers the request to a server of the multimedia contents provider. Thus, the multimedia description files include data which, in principle, are the most up-to-date ones.

In different embodiments, the information on quality of delivery belongs to the group comprising:
   a bandwidth $Q_a$ of said radiocommunications network cell;
   a number of user terminals simultaneously requesting a multimedia description file to access a multimedia content in said radiocommunications network cell;
   a user profile associated with a terminal connected to said radiocommunications network cell;
   a characteristic of a terminal connected to said radiocommunications network cell.

Thus, the optimizing device is capable of obtaining information in real time on the operational conditions in the network cell to which the user terminals in question are connected, so as to optimize the bit rates associated with each requested content chunk to prevent, reduce or ease congestion.

The optimizing device is also capable of obtaining information on the user profiles and/or on the corresponding user terminals (for example the size and the resolution of the screens of the terminals for video content) so as to take account of them for optimizing the bit rates of the accessible chunks.

In another embodiment of the invention, the user profile corresponds to a customer profile of an operator of said radiocommunications network or to a customer profile of said at least one contents provider.

Thus, the optimizing of the bit rates of the accessible chunks can take account of the profile of the users as customers of the operator of the radiocommunications network. For example arbitration between users can be done according to their subscriptions with the operator of the network (subscription with limited or unlimited data consumption, etc.).

The optimizing of the bit rates of the accessible chunks can also take account of the profiles of the users as customers of the multimedia contents provider. For example, a customer having "premium" subscription can be favored and the manifest files intended for his user terminal can be unmodified.

In different embodiments, the bandwidth $Q_a$ belongs to the group comprising:
- the total bandwidth available for the transfer of data in the network cell in question;
- a pre-determined bandwidth.

Thus, the optimizing of the bit rate of the accessible multimedia contents can be done on the basis of all or part of the effective capacity of the cell thereby reinforcing the adaptive character of the method described.

In other embodiments, the step for modifying said at least one multimedia description file is implemented on the basis of a congestion indicator in said radiocommunications cell belonging to the group comprising:
- an indicator of a congestion in progress;
- an indicator of a planned congestion;
- a piece of statistical data representing said radiocommunications network.

Thus, the optimizing of the bit rates of the accessible chunks according to the technique described is implemented only if the network cell is in a situation that can be likened to a congestion or if such a congestion is envisaged or foreseeable (for example a sports event or a concert for which the broadcast is planned at a given time and could lead to an increase in demand for multimedia content).

The technique described is implemented only if necessary, i.e. in a situation of congestion, in order to minimize the impact of this technique when its application does not seem to be necessary.

In another embodiment of the invention, the step for modifying said at least one multimedia description file comprises a sub-step of elimination, for at least one chunk of said at least one multimedia content, of at least one available quality corresponding to a bit rate higher than a preliminarily obtained average bit rate $Q_{av}$, said sub-step of elimination being implemented when a maximum bit rate $Q_i^{max}$ borne by said at least one user terminal is higher than said average bit rate $Q_{av}$.

Thus, according to this embodiment, the optimizing of the bit rate is obtained by the elimination of one or more choices of quality available in the manifest file, when this choice or these choices of quality correspond to bit rates higher than an average bit rate that is sought to ensure for each user terminal connected in the cell of the network.

In this way, a fair distribution between the user terminals of the radiofrequency resources available in the cell of the network is obtained, the average bit rate that it is sought to ensure for each being identical.

According to one particular characteristic, the profile of the users as customers of the multimedia contents provider can be taken into consideration to implement this sub-step of elimination. For example, a customer known as a "premium" customer can be favored and in this case either the elimination is not done in a manifest file requested by a "premium" user, or the elimination is done differently (for example, only certain of the qualities that would have been eliminated for a "non-premium" user are eliminated for a "premium" user).

In another embodiment of invention, said at least one eliminated available quality corresponds to a bit rate greater than said average bit rate $Q_{av}$ to which a margin $Q_{diff}$ is added, this margin $Q_{diff}$ being decremented at a subsequent implementation of said step of elimination.

Thus, this embodiment of invention provides that a stage representing a congestion or an absence of congestion associated with the cell is maintained by the optimizing device so as to optimize the bit rate gradually.

In this way, the eliminated available qualities in the manifest files are small in number at the beginning of a detected congestion of the network cell and become increasingly numerous as and when there are successive requests from user terminals for a multimedia content if the congestion situation lasts. Thus, it is possible to obtain a soft transition from a non-regulated situation of bit rates available for these contents, corresponding to a non-congested state of the cell, up to a situation of complete regulation in a situation of lasting congestion.

In another embodiment, the step for modifying said at least one multimedia description file comprises the following sub-steps, prior to said step of elimination:
- obtaining a piece of information representing said maximum bit rate $Q_i^{max}$ borne by said at least one user terminal and a piece of information representing the bandwidth $Q_a$ of said radiocommunications network cell;
- computing said average bit rate $Q_{av}=Q_a/N$, N representing the number of user terminals connected to said radiocommunications network cell requesting at least one of said multimedia contents.

Thus, the optimizing of the bit rate obtained by the sharing of the radiofrequency resources is done equitably and in an optimized way between the user terminals, the average bit rate that it is sought to guarantee for each being identical and the sum of these bit rates corresponding to the bandwidth of the radiocommunications network cell (for example the bandwidth allocated to the access to the multimedia contents in the radiocommunications network cell in question, or the total bandwidth available for the transfer of data in the network cell in question, etc.).

In another embodiment of the invention, said at least one multimedia description file is a file according to the MPD (Media Presentation Description) standard, and said at least one user terminal implements a client according the DASH (Dynamic Adaptive Streaming over HTTP standard, with HTTP corresponding to HyperText Transfer Protocol).

Thus, the format of the manifest file gives access to a quality associated with a bit rate for each multimedia content chunk listed, thus enabling the optimizing device to eliminate certain inputs (therefore certain qualities available in principle) on the basis of a piece of information representing a quality of delivery and thus optimizing the bit rate of multimedia contents accessible by the user terminals connected to the network cell.

In another embodiment of the invention, the device for optimizing the bit rate is located in a server according to the MEC (Mobile Edge Computing) standard.

Thus, the device for optimizing the bit rate has the benefit of direct access to all the operational conditions of the cell of the radiocommunications network in order to optimize the bit rate of the multimedia contents accessible by the user terminals connected to the network cell.

In another embodiment of the invention, the device for optimizing the bit rate is located in a server of said at least one multimedia contents provider.

Thus, the multimedia contents provider can have direct and easy control over the modification of the MPD files that have to be sent back to the user terminals.

The invention also relates to a computer program comprising program code instructions to implement a method for optimizing the bit rate of multimedia contents accessible by at least one user terminal connected to a radiocommunications cell as described here above, according to any one of its different embodiments, when said program is executed by a processor.

Another embodiment of the invention proposes a device for optimizing the bit rate of multimedia contents accessible by a plurality of user terminals connected to a radiocommunications network cell, said multimedia contents being stored in the form of a plurality of independent chunks on at least one multimedia contents server associated with at least one contents provider. Such a device for optimizing the bit rate comprises a reprogrammable computing machine or a dedicated computing machine capable of being configured to:
  receive at least one request to obtain at least one file representing at least one available quality corresponding to a bit rate for at least one chunk of at least one of said multimedia contents, called a multimedia description file, said request being sent by at least one user terminal of said plurality of user terminals to access said at least one multimedia content;
  obtain said at least one multimedia description file;
  modify said at least one multimedia description file on the basis of at least one piece of information representing a quality of delivery, of said at least one multimedia content, to the at least one user terminal, called a piece of information on quality of delivery, said modification delivering at least one modified multimedia description file; and
  transmit said at least one modified multimedia description file to said at least one user terminal in response to said at least one request.

Thus, according to yet another aspect, the invention also relates to a device for optimizing the bit rate of multimedia contents accessible by a plurality of user terminals connected to a radiocommunications network cell that is especially capable of implementing the method for optimizing the bit rate of multimedia contents accessible by a plurality of user terminals connected to a radiocommunications network cell according to the invention (according to any one of the different embodiments mentioned here above).

4 LIST OF FIGURES

Other features and advantages of the invention shall appear from the following description, given by way of an indicative and non-exhaustive example and from the appended drawings of which:

rate of multimedia contents accessible by a user terminal according to different embodiments of the invention.

5 DETAILED DESCRIPTION OF THE INVENTION

In all the figures of the present document, the identical elements and steps are designated by a same reference.

The general principle of the invention described consists in proposing a method for optimizing the bit rate of multimedia contents accessible by a plurality of user terminals connected to a radiocommunications network cell based on the "on the fly" modification of files listing different available qualities, corresponding to different bit rates, for a chunks of multimedia contents that the user terminals wish to access.

To this end, a device for optimizing the bit rate (or through-put-rate optimizing device) receives a request sent by a user terminal for a multimedia description file, or manifest file, corresponding to a multimedia content being sought. The bit-rate optimizing device then obtains the requested manifest file, this file listing the available chunks of the multimedia content requested as well as the associated quality (and therefore the corresponding bit rate). The bit-rate optimizing device then modifies the manifest file on the basis of a piece of information representing a quality of delivery, taking into account additional criteria distinct from the only request from the user terminal before transmitting the file to the user terminal that has transmitted the request.

Figure 2A:
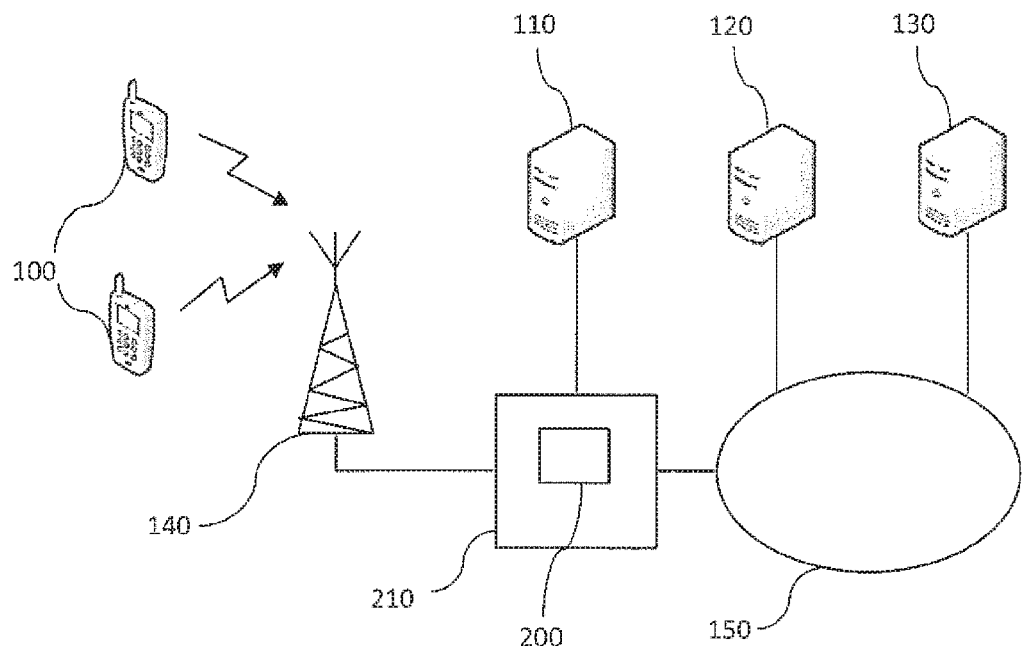
FIGS. 2a, 2b and 2c illustrate a configuration of a cell type radiocommunications network and the interaction between entities of such a network during access by a user terminal to a remote multimedia content, according to different embodiments of the invention.
Figure 2B:
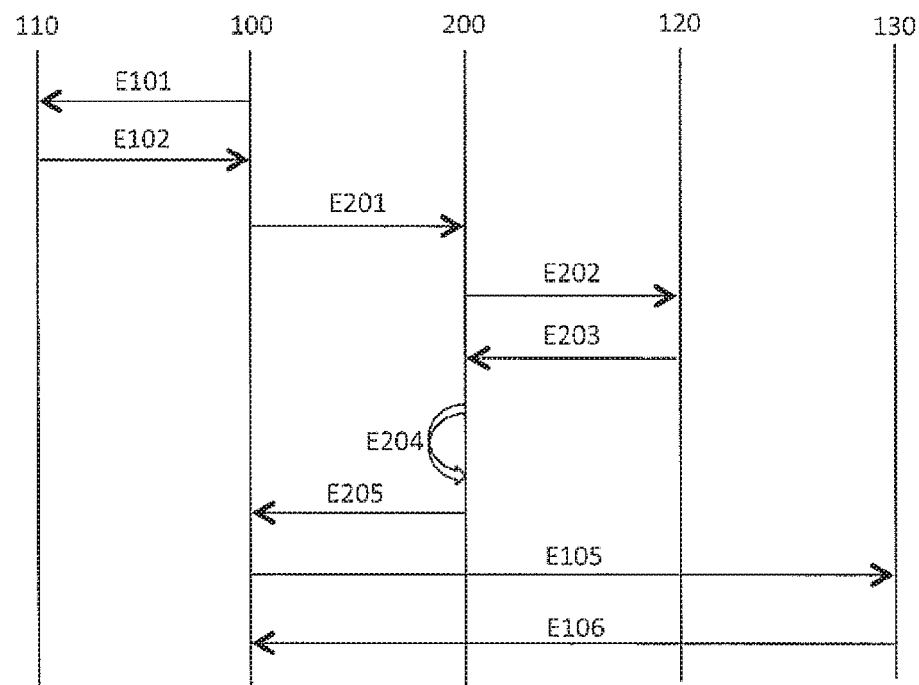
Figure 2C:
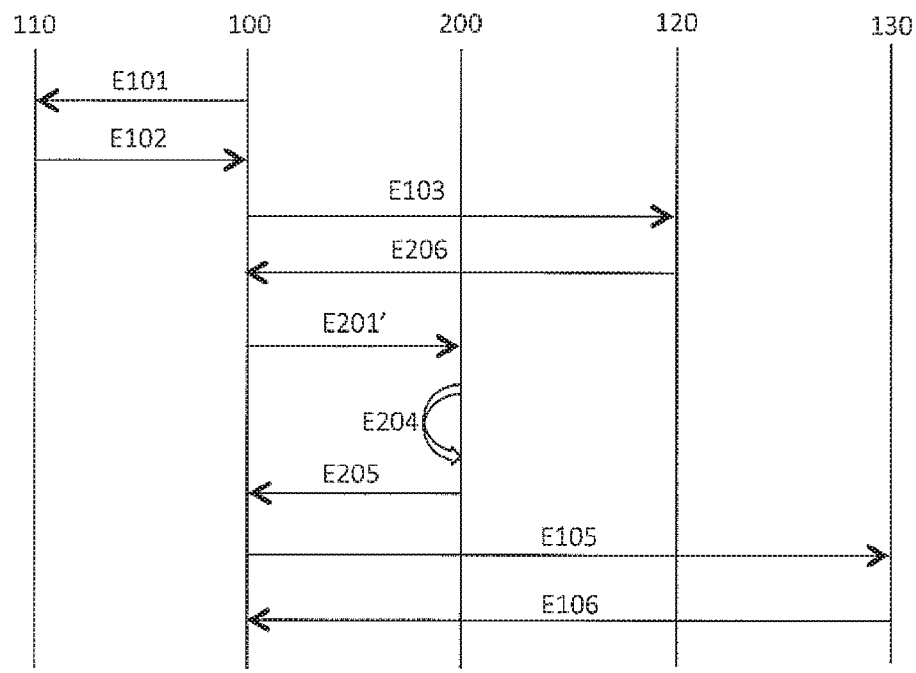

Referring now to FIGS. 2a, 2b and 2c, a description is provided of the interactions between entities of a cell type radiocommunications network during access to a user terminal to a remote multimedia content, according to different embodiments of the invention, as well as the corresponding network configuration (FIG. 2a).

More specifically, in this configuration, the radiocommunications network comprises an MEC server 210 located between the core of the network 150 and the access node 140 of the mobile network part (for example a base station of a 2G, 3G, 4G, and other type of cell network). A bit-rate optimizing device 200 implementing the described technique is then included in the MEC server 210.

According to the embodiment illustrated in FIG. 2b, at a step E201, a user request for an MPD type manifest file corresponding to a multimedia content being sought, transmitted by a user terminal 100 implementing a DASH client, is received by the bit-rate optimizing device 200 located in the MEC server 210 of the cell radiocommunications network to which the user terminal 100 is connected. According to this embodiment of the invention, the request is not transmitted directly to the management server 120 of the multimedia content provider as in the known technique described with reference to FIG. 1.

According to this embodiment, the bit-rate optimizing device 200 therefore behaves like a proxy server towards user terminals seeking to obtain a multimedia content from the provider of multimedia contents with which they are identified (or recorded) during the steps E101 and E102 and therefore the servers are connected to the radiocommunications network in question.

For the management server 120 of the multimedia content provider to be capable of providing the required manifest file, the bit-rate optimizing device 200 sends the request at a step E202.

At a step E203, the bit-rate optimizing device 200 receives, in response, an MPD manifest file comprising a list of available chunks on the multimedia content servers 130 of the multimedia content provider for the multimedia content sought, as well as the associated quality (and corresponding bit rate).

At a step E204, the optimizing device modifies the contents of the MPD file on the basis of a piece of information representing a quality of delivery in order to optimize the bit rate for the chunks of the multimedia content that are accessible by the user terminal.

In variants, the information representing a quality of delivery corresponds to:
- a bandwidth $Q_a$ of the radiocommunications network cell to which the user terminal 100 is connected;
- a number of user terminals simultaneously requesting a multimedia description file in the radiocommunications network cell;
- a user profile associated with the user terminal 100 and/or with a another user terminal connected to the same cell;
- a characteristic of the user terminal 100 and/or another user terminal connected to the same cell.

Thus, the bit-rate optimizing device 200, located in a server situated between the network core 150 and the access node 140 of the mobile network part, makes advantageous use of its proximity to the access node 140 to obtain or access information in real time on the operational conditions in the network cell in question, for example the bandwidth $Q_a$ (this bandwidth could for example be adjusted as a function of the conditions of propagation of the radioelectrical signals in the cell or the effective load of the cell), or the number of user terminals simultaneously requesting a multimedia description file in the radiocommunications network cell in question.

In variants, the bandwidth $Q_a$ corresponds to:
- the total bandwidth available for the transfer of data in the network cell in question;
- a pre-determined bandwidth, for example a fraction of the total cell capacity allocated to the transfer of data or to access to multimedia contents.

Thus, the bit rate of the accessible multimedia contents can be optimized on the basis of all or part of the effective capacity of the cell, thereby reinforcing the adaptive character of the method described.

This type of function, enabling the operational conditions to be reported back, in real time or periodically, from a network cell up to applications located in a server in proximity to the cell in question, is for example laid down in the MEC approach that is now being standardized.

In one variant, the bit-rate optimizing device 200 is managed by the operator of the radiocommunications network in question, thus enabling it to address and resolve congestion that might occur in the cells of his own network.

In another variant, the bit-rate optimizing device 200 is managed by third parties, for example the multimedia content provider, thus giving this provider greater flexibility in the management of the services proposed to its customers. Besides, this approach enables the content provider to maximize a number of satisfied customers as well as offer the possibility of serving a greater number of customers.

In another embodiment, the bit-rate optimizing device 200 is located in a server of the multimedia contents provider, for example in the management server 120, thereby enabling the content provider to have direct and easy control over the modification of the MPD files that have to be sent back to the user terminals. In this case, the operational conditions of the network cell in question are reported back to the server of the multimedia contents provider by the server situated between the network core 150 and the access node 140 of the mobile network part, for example the MEC server.

Besides, according to the embodiment illustrated in FIG. 2*b*, the bit-rate optimizing device 200 plays the role of a proxy server towards the user terminals seeking to obtain a multimedia content from the multimedia contents provider with which they have identified (or registered) themselves during the step 101. This device therefore has knowledge of all the requests sent out by all the user terminals located in the network cell in question.

On the basis of the knowledge of these requests and of operational conditions of the network cell updated periodically, the bit-rate optimizing device 200 is capable of modifying each MPD manifest file corresponding to a request received during the step E201 so as to prevent, reduce or ease congestions.

In particular, the bit-rate optimizing device 200 can eliminate the entries of files for which it estimates that the associated qualities correspond to excessively high bit rates relative to the number of requests received and the bit rate that must then be guaranteed for each user. Thus, the DASH client installed on each user terminal 100 that has sent a request cannot select a chunk quality corresponding to an excessively high bit rate, since such an excessively high bit rate could penalize the other users and lead to congestion of the cell of the network.

In variants, the bit-rate optimizing device 200 also takes account of the users' profiles.

These users' profiles can be, for example, profiles of the users as customers of the multimedia contents provider. A customer known as a "premium" customer may indeed be favored and the MPD manifest files intended for his user terminal 100 may be modified differently or even may not be modified. In this case, the user profiles stored in a server of the multimedia contents provider, for example in the identification server 110 or in the management server 120, are provided to the bit-rate optimizing device 200. These profiles, duplicated on the bit-rate optimizing device 200, can then be updated periodically, automatically or on demand.

These users' profiles can also be the profiles of the users as customers of the operator of the radiocommunications network. Here too, arbitration can be done on the bit rates accessible as a function of the subscriptions of the users of the network (for example whether a subscription is oriented towards "data" or simply towards "voice communication"). In this case, the profiles of the customers of the radiocommunications network that are stored in a server of the network core, for example an AAA (Authentication, Authorization and Accounting) server, and HSS (Home Subscriber Server) or else again a PCRF (Policy and Charging Rules Function) server are therefore provided to the bit-rate optimizing device 200. These customer profiles which are duplicated on the bit-rate optimizing device 200 by the operator of the radiocommunications network can then also be updated periodically, automatically or on demand.

In other variants, the bit-rate optimizing device 200 also takes account of the characteristics of the user terminal 100.

For example, when the multimedia content requested is video content, the size and resolution of the screen of the terminal are taken into consideration to decide which are the chunks that will be accessible to the terminal (the bigger the terminal, the greater the quality and the corresponding bit rate of the authorized chunks).

In a step E205, the bit-rate optimizing device 200 transmits the modified MPD manifest file to the user terminal 100 that has transmitted the corresponding request in the step E201.

In variants, the user terminal 100, implementing a DASH client, periodically sends out a request, for example every 30 seconds, for an MPD manifest file corresponding to the multimedia content being sought. Indeed, the presence of the chunks of the multimedia content requested can change rapidly on the multimedia content servers 130 and a regular updating of the MPD manifest file can prove to be necessary.

Besides, having obtained a given chunk, the user terminal 100 can send out a request for another chunk. In this case, the steps described here above are reiterated at each new request.

In one variant, the mechanisms for the periodic sending of requests is activated via a dedicated field present in the MPD manifest files, this field indicating the duration of validity of the data present in the file, therefore making it possible to obtain the date at which a new manifest file must be requested In another variant, an equivalent field is directly inserted into the chunks obtained by the user terminal 100, thereby informing it when it must request a new manifest file in order to obtain the next chunk.

Figure 1A:
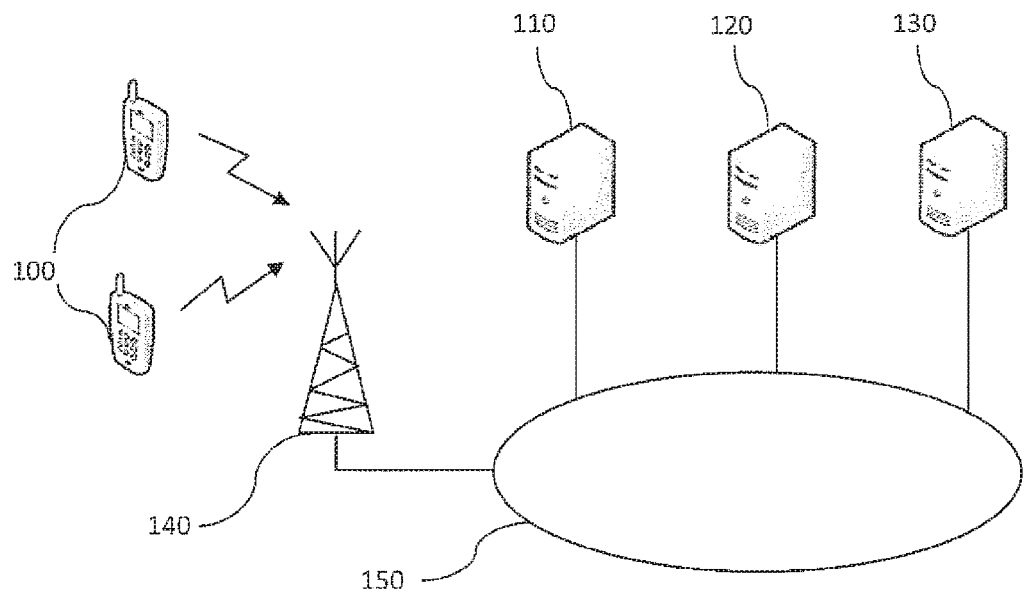
FIGS. 1a and 1b represent a configuration of a cell type radiocommunications network and the interaction between entities of such a network during the access by a user terminal to a remote multimedia content, according to one configuration of the prior art.
Figure 1B:
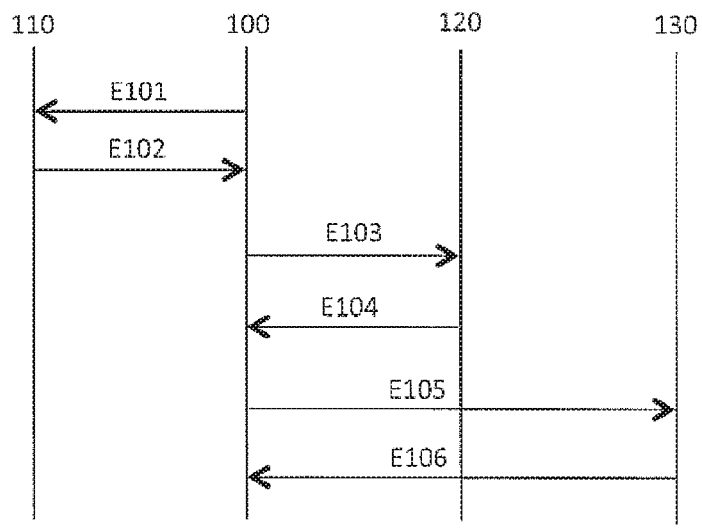

According to the embodiment illustrated in FIG. 2c, at the step E103, the user's request for a manifest file corresponding to a multimedia content being sought is sent directly to the management server 120 of the multimedia contents provider as in the prior art technique described with reference to FIG. 1a.

However, in this embodiment, at a step E206, the management server 120 sends the user terminal 100 an instruction asking it to redirect its request to the device 200 for optimizing the bit rate.

Thus, at a step E201', the request is received, this time by the bit-rate optimizing device 200.

According to this embodiment, all the requests for obtaining an MPD manifest file that the user terminals send the servers of the multimedia content provider with which they had identified themselves (or registered) at the step 101 are systematically redirected towards the bit-rate optimizing device 200. As a result, the bit-rate optimizing device 200 is capable of then executing the same steps E204 and E205 as those of the embodiment described with reference to FIG. 2a.

According to one alternative, the bit-rate optimizing device 200 also executes the steps E202 and E203 in order to obtain, from the management server 120 of the multimedia contents provider, an MPD manifest file corresponding to the request received at a step E201'. In this case, the bit-rate optimizing device 200 does not directly manage the MPD manifest files but transfers the request to a server of the multimedia content provider so as to retrieve MPD manifest files comprising data which in principle are the most up-to-date data.

According to another alternative, the MPD files are directly stored in the bit-rate optimizing device 200, for example following a preliminary installation on a server of the multimedia content provider. Thus, the bit-rate optimizing device 200 does not need to transmit the request to the management server 120 in order to obtain the MPD file in return.

In yet another alternative, the bit-rate optimizing device 200 is capable of building the MPD file on the basis of information that that it has at its disposal on the accessible multimedia contents. This information in this case is provided preliminarily or on demand by the multimedia contents provider in question.

Figure 3:
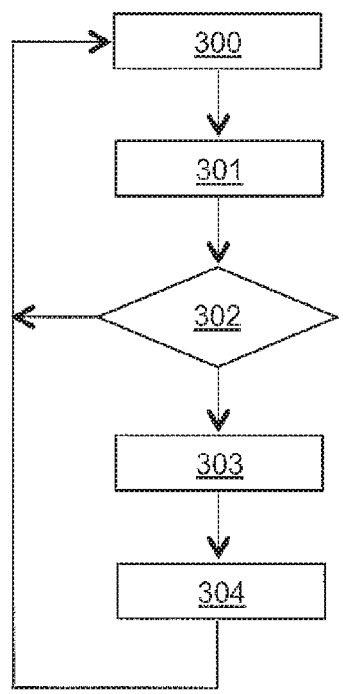
FIG. 3 illustrates the step of a method for optimizing the bit rate of multimedia contents accessible by a user terminal according to one embodiment of the invention.

Referring now to FIG. 3, a description is provided of the steps of a method for optimizing the bit rate of multimedia contents accessible by user terminals according to one embodiment of the invention.

In this embodiment, the user terminals 100 are connected to the network cell corresponding to the access node 140 and simultaneously request a multimedia content from a content provider.

In a step 300, the bit-rate optimizing device 200 obtains N pieces of information on maximum bit rate $Q_i^{max}$ with i being an integer ranging from 1 to N, the maximum bit rate $Q_i^{max}$ corresponding to the maximum bit rate borne by the i-th user terminal 100.

In one variant, this information is obtained through the profile of the users of the terminals 100 as customers of the operator of the radiocommunications network, this profile containing the characteristics of the user terminals 100 used. As described with reference to FIG. 2b, the profiles of the customers of the radiocommunications network are for example stored in a server of the AAA or HSS type network core, and are duplicated on to the bit-rate optimizing device 200 by the operator of the radiocommunications network. These profiles can then also be updated periodically, automatically or on demand.

In another variant, this information is obtained via the users' profiles, from the terminals 100, taken as customers of the multimedia contents provider, these profiles containing information on the preferences of the multimedia content users, especially the type of apparatus used and its characteristics. Here too, the customers' profiles are stored in a server of the multimedia contents provider, for example in the identification server 110 or in the management server 120 and duplicated on to the bit-rate optimizing device 200 by the content provider. They can then be updated periodically, automatically or on demand.

At a step 301, the bit-rate optimizing device 200 obtains a piece of information representing the bandwidth $Q_a$ of the network cell to which the N user terminals 100 are connected. In this embodiment, the bandwidth $Q_a$ corresponds to a bandwidth allocated to the access to the multimedia contents. As already described, in other embodiments, the bandwidth $Q_a$ can correspond to:

the total bandwidth available for the transfer of data in the network cell in question;

a pre-determined bandwidth for example a fraction of the total capacity of the cell that is allocated to the transfer of data.

In a step 302, the bit-rate optimizing device 200 determines, on the basis of a congestion indicator, whether the network cell is in a situation that can be likened to congestion. In variants, the congestion indicator belongs to the group comprising:

an indicator of a congestion in progress;

an indicator of an expected congestion, for example if a particular event (a sports event, concert etc.) is planned for a given time, possibly causing an increase in demand for a multimedia content;

a piece of statistical data representing the radiocommunications network, for example the progress in time of the number of users' terminals connected to the network cell that can pre-suppose a congestion to come.

In one variant, the device 200 for optimizing the bit rate determines whether the bandwidth effectively used to access multimedia contents in the cell is above a threshold proportional to the bandwidth $Q_a$ of the network cell to which the N user terminals 100 are connected and that is allocated for access to the multimedia contents. This threshold can for example correspond to 80% of the bandwidth $Q_a$. Thus the steps 303 and 304, described here below, that carry out the effective modification of the MPD manifest files that have to be returned to the N user terminals are not performed unless the bandwidth effectively used in the cell approaches the bandwidth $Q_a$, i.e. unless it is considered to be the case that there is a situation of congestion or that such a situation is being approached. If this is not the case, the bit-rate optimizing device 200 will make no modifications of the manifest files and will resume the execution of the methods described since the initial step 300.

At a step 303, in the event of congestion, i.e. if it has been determined, at the step 302, that the bandwidth effectively used is greater than a threshold, the bit-rate optimizing device 200 computes an average bit rate $Q_{av}=Q_d/N$. The average bit rate $Q_{av}$ thus obtained represents the bit rate that it is sought to guarantee for each user terminal 100 connected to the network cell in an approach of fair distribution of these radio resources allocated for access to multimedia contents.

At a step 304, the bit-rate optimizing device 200 modifies each manifest file that has to be returned to each user terminal 100 if the maximum bit rate borne by this user terminal 100 is greater than the average bit rate $Q_{av}$ obtained at the step 303. In particular, the bit-rate optimizing device 200 modifies the MPD manifest file that has to be returned to the ith user terminal 100 if the maximum bit rate $Q_i^{max}$ borne by this user terminal is greater than the average bit rate $Q_{av}$ obtained at the step 303.

In one variant, the bit-rate optimizing device 200 eliminates the entries corresponding to the chunks of the requested multimedia content that have a quality corresponding to a bit rate higher than an average bit rate $Q_{av}$. Thus, in this variant, the DASH clients embedded in the N user terminals 100 that could support bit rates higher than the average bit rate $Q_{av}$ are presented only with choices of multimedia content chunks corresponding to bit rates below this average bit rate $Q_{av}$. None of these DASH clients could then make a choice of chunks leading to congestion in the cell. The customers will thus have better quality of experience through the minimizing of the oscillation of quality while making it possible to have greater fairness among users.

In another variant, the bit-rate optimizing device 200 eliminates the inputs corresponding to the chunks of the requested multimedia content that have a quality corresponding to a bit rate higher than the average bit rate $Q_{av}$ to which a margin $Q_{diff}$ is added. Thus, only the inputs corresponding to the chunks that have a quality corresponding to a bit rate higher than $Q_{av}+Q_{diff}$ are eliminated. Besides the margin $Q_{diff}$ is decremented in time so that the eliminations in the MPD manifest file are small in number at the start of the implementation of the technique described and increase as and when the method is iterated. Thus, a soft transition can be obtained, from a non-regulated situation corresponding to a state of non-congestion up to a situation of complete regulation when congestion is underway.

The application of this margin $Q_{diff}$ can therefore be conditioned by the knowledge of a state representing congestion or the absence of congestion in the cell. Besides, it must be made sure that this margin $Q_{diff}$ cannot be negative so as not to eliminate any quality corresponding to a bit rate below the average bit rate $Q_{av}$.

According to one alternative, the quality of a chunk is represented by an index, for example an integer converted into a corresponding bit rate through a dedicated conversion function. In this case, the margin corresponds, for example, to a percentage of the quality in question.

Figure 4:
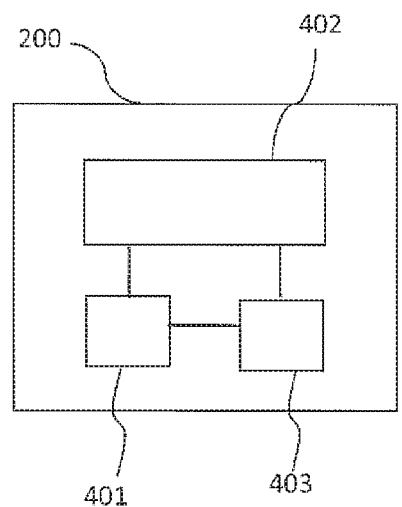

Referring now to FIG. 4, we shall describe an example of a structure of a bit-rate optimizing device 200 according to different embodiments of the invention.

The bit-rate optimizing device 200 comprises a random-access memory (for example a RAM), a processing unit 402 equipped for example with a processor and driven by a computer program stored in a read-only memory 401 (for example a ROM or a hard disk drive). At initialization, the code instructions of the computer program are for example loaded into the random-access memory 403 and then executed by the processor of the processing unit 402.

This FIG. 4 illustrates only one particular way, among several possible ways, of implementing the bit-rate optimizing device 200. Indeed, the technique of the invention can be carried out equally well on a reprogrammable computing machine (a PC, a DSP processor or a microcontroller) executing a program comprising a sequence of instructions or a dedicated computation machine (for example a set of logic gates such as an FPGA or an ASIC or any other hardware module).

Should the invention be implanted in a reprogrammable computation machine, the corresponding program (i.e. the sequence of instructions) could be stored in a storage medium that is detachable (such as for example a floppy disk, a CD-ROM or a DVD-ROM) or not detachable, this storage medium being partially or totally readable by a computer or a processor.

The invention claimed is:

1. A method comprising the following acts performed by a device for optimizing bit rate:
    optimizing bit rate of multimedia contents accessible by a plurality of user terminals connected to a radiocommunications network cell, said multimedia contents being stored in the form of a plurality of independent chunks on at least one multimedia contents server associated with at least one contents provider, wherein said optimizing bit rate comprises the following steps:
    receiving at least one request to obtain at least one file representing at least one available quality corresponding to a bit rate for at least one chunk of at least one of said multimedia contents, called a multimedia description file, said request being sent by at least one user terminal of said plurality of user terminals to access said at least one multimedia content;
    obtaining said at least one multimedia description file;
    modifying said at least one multimedia description file on the basis of at least one piece of information representing a quality of delivery of said at least one multimedia content to the at least one user terminal, called information on quality of delivery,
    said modification comprising a sub-step of elimination, for at least one chunk of said at least one multimedia content, of at least one available quality corresponding to a bit rate higher than a preliminarily obtained average bit rate $Q_{av}$, said sub-step of elimination being implemented when a maximum bit rate $Q_i^{max}$ borne by said at least one user terminal is higher than said average bit rate $Q_{av}$,
    said at least one eliminated available quality corresponding to a bit rate higher than said average bit rate $Q_{av}$ to which a margin $Q_{diff}$ is added, this margin $Q_{diff}$ being decremented at a subsequent implementation of said step of elimination,
    said modification delivering at least one modified multimedia description file; and
    transmitting said at least one modified multimedia description file to said at least one user terminal in response to said at least one request.

2. The method for optimizing the bit rate according to claim 1, wherein said step of obtaining comprises the following sub-steps:
    transmitting said at least one request to at least one management server of said at least one contents provider; and receiving said at least one multimedia description file, said multimedia description file being transmitted by said at least one management server of said at least one contents provider.

3. The method for optimizing the bit rate according to claim 1, wherein said information on quality of delivery belongs to the group consisting of:
   a bandwidth $Q_a$ of said radiocommunications network cell;
   a number of user terminals simultaneously requesting a multimedia description file to access a multimedia content in said radiocommunications network cell;
   a user profile associated with a terminal connected to said radiocommunications network cell;
   a characteristic of a terminal connected to said radiocommunications network cell.

4. The method for optimizing the bit rate according to claim 3, wherein said user profile corresponds to a customer profile of an operator of said radiocommunications network or to a customer profile of said at least one contents provider.

5. The method for optimizing the bit rate according to claim 3, wherein the bandwidth $Q_a$ belongs to the group consisting of:
   the total bandwidth available for the transfer of data in the network cell in question;
   a pre-determined bandwidth.

6. The method for optimizing the bit rate according to claim 1, wherein said step of modifying said at least one multimedia description file is implemented on the basis of a congestion indicator in said radiocommunications cell belonging to the group consisting of:
   an indicator of a congestion in progress;
   an indicator of a planned congestion;
   a piece of statistical data representing said radiocommunications network.

7. The method for optimizing the bit rate according to claim 1, wherein said step of modifying said at least one multimedia description file comprises the following sub-steps, prior to said step of elimination:
   obtaining a piece of information representing said maximum bit rate $Q_i^{max}$ borne by said at least one user terminal and a piece of information representing the bandwidth $Q_a$ of said radiocommunications network cell;
   computing said average bit rate $Q_{av}=Q_a/N$, N representing the number of user terminals connected to said radiocommunications network cell requesting at least one of said multimedia contents.

8. The method for optimizing the bit rate according to claim 1, said at least one multimedia description file being a file according to the MPD (Media Presentation Description) standard, and said at least one user terminal implementing a client according to the DASH (Dynamic Adaptive Streaming over HTTP standard, with HTTP corresponding to HyperText Transfer Protocol).

9. The method for optimizing the bit rate according to claim 1, said device for optimizing the bit rate being located in a server according to the MEC (Mobile Edge Computing) standard.

10. The method for optimizing the bit rate according to claim 1, said device for optimizing the bit rate being located in a server of said at least one multimedia contents provider.

11. A non-transitory computer-readable medium comprising instructions stored thereon to implement a method, when said instructions are executed by a processor of a device for optimizing bit rate, wherein the method comprises:
   optimizing bit rate of multimedia contents accessible by a plurality of user terminals connected to a radiocommunications network cell, said multimedia contents being stored in the form of a plurality of independent chunks on at least one multimedia contents server associated with at least one contents provider, wherein said optimizing bit rate comprises the following steps:
   receiving at least one request to obtain at least one file representing at least one available quality corresponding to a bit rate for at least one chunk of at least one of said multimedia contents, called a multimedia description file, said request being sent by at least one user terminal of said plurality of user terminals to access said at least one multimedia content;
   obtaining said at least one multimedia description file;
   modifying said at least one multimedia description file on the basis of at least one piece of information representing a quality of delivery of said at least one multimedia content to the at least one user terminal, called information on quality of delivery,
   said modification comprising a sub-step of elimination, for at least one chunk of said at least one multimedia content, of at least one available quality corresponding to a bit rate higher than a preliminarily obtained average bit rate $Q_{av}$, said sub-step of elimination being implemented when a maximum bit rate $Q_i^{max}$ borne by said at least one user terminal is higher than said average bit rate $Q_{av}$,
   said at least one eliminated available quality corresponding to a bit rate higher than said average bit rate $Q_{av}$ to which a margin $Q_{diff}$ is added, this margin $Q_{diff}$ being decremented at a subsequent implementation of said step of elimination,
   said modification delivering at least one modified multimedia description file; and
   transmitting said at least one modified multimedia description file to said at least one user terminal in response to said at least one request.

12. A device for optimizing bit rate of multimedia contents accessible by a plurality of user terminals connected to a radiocommunications network cell, said multimedia contents being stored in the form of a plurality of independent chunks on at least one multimedia contents server associated with at least one contents provider, wherein said device for optimizing the bit rate comprises:
   a reprogrammable computing machine or a dedicated computing machine configured to:
   receive at least one request to obtain at least one file representing at least one available quality corresponding to a bit rate for at least one chunk of at least one of said multimedia contents, called a multimedia description file, said request being sent by at least one user terminal of said plurality of user terminals to access said at least one multimedia content;
   obtain said at least one multimedia description file;
   modify said at least one multimedia description file on the basis of at least one piece of information representing a quality of delivery of said at least one multimedia content, to the at least one user terminal, called a piece of information on quality of delivery,
   said modification comprising a sub-step of elimination, for at least one chunk of said at least one multimedia content, of at least one available quality corresponding to a bit rate higher than a preliminarily obtained average bit rate $Q_{av}$, said sub-step of elimination being implemented when a maximum bit rate $Q_i^{max}$ borne by said at least one user terminal is higher than said average bit rate $Q_{av}$, said at least one eliminated available quality corresponding to a bit rate higher than said average bit rate $Q_{av}$ to which a margin $Q_{diff}$ is added, said margin $Q_{diff}$ being decremented at a subsequent implementation of said elimination, said modification delivering at least one modified multimedia description file; and transmit said at least one modified multimedia description file to said at least one user terminal in response to said at least one request.

* * * * *